United States Patent
Lee et al.

(10) Patent No.: US 7,890,140 B2
(45) Date of Patent: Feb. 15, 2011

(54) MACRO IMPLEMENTING METHOD AND APPARATUS USING SAT BETWEEN SUBSCRIBER IDENTITY MODULE AND MOBILE EQUIPMENT

(75) Inventors: Seung-Ho Lee, Suwon-si (KR); Sang-Young Ju, Seoul (KR)

(73) Assignee: Samsung Electronics Co., Ltd (KR)

( * ) Notice: Subject to any disclaimer, the term of this patent is extended or adjusted under 35 U.S.C. 154(b) by 941 days.

(21) Appl. No.: 11/348,498

(22) Filed: Feb. 6, 2006

(65) Prior Publication Data

US 2006/0205435 A1 Sep. 14, 2006

(30) Foreign Application Priority Data

Mar. 14, 2005 (KR) .................... 10-2005-0021035

(51) Int. Cl.
*H04B 1/38* (2006.01)
(52) U.S. Cl. ............... 455/558; 455/556.1; 379/433.09; 379/357.01
(58) Field of Classification Search ............. 455/558, 455/550.1, 418, 419, 90.1, 410, 411, 414.1, 455/556.1; 379/433.09, 357, 357.01; 710/13
See application file for complete search history.

(56) References Cited

U.S. PATENT DOCUMENTS

| | | | |
|---|---|---|---|
| 6,097,967 A | 8/2000 | Hubbe et al. | |
| 6,667,748 B1 | 12/2003 | Hubbe et al. | |
| 6,816,837 B1 * | 11/2004 | Davis | 704/275 |
| 7,353,044 B2 * | 4/2008 | Nachef | 455/558 |
| 2002/0080190 A1 * | 6/2002 | Hamann et al. | 345/810 |
| 2002/0137545 A1 * | 9/2002 | Nachef | 455/558 |
| 2003/0073440 A1 * | 4/2003 | Mukherjee et al. | 455/435 |
| 2003/0162529 A1 * | 8/2003 | Noblins | 455/411 |

(Continued)

FOREIGN PATENT DOCUMENTS

CN 1399851 2/2003

(Continued)

OTHER PUBLICATIONS

Digital Cellular Telecommunications System (Phase 2'); Universal Mobile Telecommunications System (UMTS); USIM Application Toolkit (USAT); Jun. 2002.

*Primary Examiner*—Dominic E Rego
(74) *Attorney, Agent, or Firm*—The Farrell Law Firm, P.C.

(57) ABSTRACT

Disclosed is a macro implementing method and apparatus that can perform a series of operations desired by a user through an interface between an ME (Mobile Equipment) and a SIM (Subscriber Identity Module) that support a SAT (Sim Application Toolkit). A combination of commands is provided so that a series of operations desired by the user can be performed in the ME using the SAT. The ME can provide a user-defined SAT service for automatically performing a series of operations desired by the user by combining and storing SAT commands so that a series of operations desired by the user can be performed. Thereafter a SIM application in the SIM can be successively performed using stored SAT commands. The terminal user directly constructs a single macro by tying several commands using the SAT, and thus operations that require repeated operations or complicated execution processes can successively be performed using a single execution input.

16 Claims, 6 Drawing Sheets

U.S. PATENT DOCUMENTS

| | | | |
|---|---|---|---|
| 2003/0204403 A1* | 10/2003 | Browning | 704/270 |
| 2004/0012615 A1* | 1/2004 | Jang | 345/661 |
| 2004/0076131 A1* | 4/2004 | Qu et al. | 370/335 |
| 2004/0147284 A1* | 7/2004 | Laumen et al. | 455/558 |
| 2005/0070291 A1* | 3/2005 | Shi | 455/445 |
| 2009/0020602 A1* | 1/2009 | Pratone | 235/380 |

FOREIGN PATENT DOCUMENTS

| | | |
|---|---|---|
| DE | 102 00 278 | 7/2003 |
| KR | 2001-0111610 | 12/2001 |
| WO | WO 01/50712 | 7/2001 |

* cited by examiner

FIG.1

Proactive Command
{
200 {

| Description | M / O / C | Length |
|---|---|---|
| Proactive UICC command Tag | M | 1 |
| Length (A+B+C+D+E+F) | M | |
| Command details (230) | M | A |
| Device identities (240) | M | B |
| Alpha identifier | O | C |
| etc | O | D, E, F |

FIG.2A

Command details (230)

| Byte (s) | Description | Length |
|---|---|---|
| 1 | Command details tag | 1 |
| 2 | Length = '03' | 1 |
| 3 | Command number | 1 |
| 4 | Type of command | 1 |
| 5 | Command Qualifier | 1 |

FIG.2B

| Byte (s) | Description | Length |
|---|---|---|
| 1 | Device identities tag | 1 |
| 2 | Length = '02' | 1 |
| 3 | Source device identity | 1 |
| 4 | Destination device identity | 1 |

Device identities (240)

FIG.2C

| Description | M / O / C | Length |
|---|---|---|
| Command tag | M | 1 |
| Length | M | X |
| Device identities | M | A |
| etc. | O | B |

Envelope Command

300 — Command tag
310 — Length
320 — Device identities, etc.

MACRO IMPLEMENTING METHOD AND APPARATUS USING SAT BETWEEN SUBSCRIBER IDENTITY MODULE AND MOBILE EQUIPMENT

PRIORITY

This application claims priority to an application entitled "Macro Implementing Method and Apparatus Using SAT Between SIM and ME" filed in the Korean Industrial Property Office on Mar. 14, 2005 and assigned Serial No. 2005-21035, the contents of which are incorporated herein by reference.

BACKGROUND OF THE INVENTION

1. Field of the Invention

The present invention relates to a macro implementing method and apparatus using a SAT (SIM Application Toolkit) that can provide a user-defined SAT service for automatically performing a series of operations desired by a user.

2. Description of the Related Art

Generally, a SAT (SIM Application Toolkit) refers to a series of functions which are capable of providing a service to a mobile communication terminal, and is an interface which provides for mutual communication between a SIM (Subscriber Identity Module) and an ME (Mobile Equipment: i.e., a mobile communication terminal exclusive of the SIM).

SATs can provide the services (known as SAT sessions) only when both the SIM and the ME support the SAT. In a SAT session, a SIM starts communication with a user of a mobile communication terminal (ME) by transmitting a processing command to the ME. As defined in the $3^{rd}$ Generation Partnership Project (3GPP) Technical Specification (TS) 31.111 Universal Subscriber Identity Module (USIM) Application Toolkit (USAT), 3GPP TS 11.14 Specification of the SIM Application Toolkit for the Subscriber Identity Module—Mobile Equipment (SIM-ME) Interface, commands that drive the SAT include proactive commands directed from the SIM to the ME and envelope commands directed from the ME to the SIM.

As described above, in a SAT session, communications through the processing commands of the SIM are performed. Conventionally, there are text interfaces by proactive commands such as <DISPLAY TEXT>, <GET INKEY>, <GET INPUT>, etc., and monotonous interfaces that provide an audio tone to a user using a command of <PLAY TONE> and so on. In addition, there are commands such as <MORE TIME>, <TONE PLAY>, <POLL INTERVAL>, <REFRESH>, <SETUP MENU>, <SELECT ITEM>, <SEND SM>, <SEND SS>, <SEND USSD>, <SETUP CALL>, <TIMER MANAGEMENT>, etc. Meanwhile, as envelop commands, there are <Data Download to SIM>, <Menu Selection>, <Call Control by SIM>, <Timer Expiration>, <Event Download>, etc.

Service providers can also provide SIM applications by using services such as a service for transmission/reception of combined commands in the form of an SMS to provide a specified information service or a service for a call connection to a specified service number through combination of commands. These services can be independently developed by the Service Providers (e.g., proprietary services) or can shared between several Service Providers. In other words, a conventional terminal can only provide a built-in SAT service implemented in advance by a service provider through a SAT for a specified service in a SIM. Accordingly, the mobile communication terminal's user can only select a SAT menu provided in the terminal and request a specified service such as weather information, traffic information, etc., by sending a text message through the SAT menu or by using the calling function of mobile communication terminal.

However, as diverse services and additional functions of a mobile communication terminals are increasing, a more efficient use of the SAT is required. Accordingly, in order to increase utility value of the SAT in the mobile communication terminal and to satisfy user's needs, it is necessary to incorporate the SAT with the additional services and functions that can be provided in the mobile communication terminal. The conventional SAT is a monotonous SAT in that it only can process a single command at a time.

In other words, as additional functions are added to the mobile communication terminal, the SAT service utilization and convenience of use of the SAT service, should be maximized.

However, when the users of conventional mobile communication terminals perform a series of operations using the conventional SAT (i.e., monotonous SAT), the different commands for the respective operations must be input one at a time which can inconvenience the user.

Although a built-in SAT service provided by the service provider when the product is sent out can be provided, there is no way to provide diverse SAT services to the user by controlling the SAT to perform a series of operations desired by the user. That is, an interface protocol between the SIM and the ME for repeatedly performing the operations required by the user is not described, and thus the SAT use in the user terminal is limited.

SUMMARY OF THE INVENTION

Accordingly, the present invention has been designed to solve the above and other problems occurring in the prior art, and provides a macro implementing method and apparatus using a SAT (Sim Application Toolkit) between a SIM (Subscriber Identity Module) and an ME (Mobile Equipment) which enables the ME to provide a user-defined SAT service for automatically performing a series of operations desired by a user through the SAT that can provide an interface between the SIM and the ME.

In one aspect of the present invention, there is provided an apparatus for implementing a macro between a SIM (Subscriber Identity Module) and an ME (Mobile Equipment) using a SAT (Sim Application Toolkit), which includes the ME for providing a menu for a macro edition, and displaying an edition function corresponding to the macro edition menu on a display unit to enable the user to edit the macro, if the macro edition menu is selected by a user, and the SIM for receiving information input from the user with respect to at least one edition function being displayed on the display unit, constructing the input information as respective commands, and storing the commands as a single macro, wherein the ME successively reads the commands that constitute one macro stored in the SIM and performs a series of operations according to the commands, if a macro execution instruction is input from the user.

In another aspect of the present invention, there is provided a macro implementing method using a SAT (Sim Application Toolkit) between a SIM (Subscriber Identity Module) and an ME (Mobile Equipment), which includes displaying sub-menus of the macro edition menu, if a menu for a macro edition is selected by a user; transferring the input information to the SIM, the SIM storing respective commands by coding the transferred information in a specified format, if information for controlling the ME is input from the user for each of the sub-menus; and producing a macro for successively performing a series of operations according to the commands by tying the stored commands, if the macro edition is completed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail hereinafter with reference to the accompanying drawings. In the following description of the present invention, the same drawing reference numerals are used for the same elements even in different drawings. Additionally, a detailed description of known functions and configurations incorporated herein will be omitted when it may obscure the subject matter of the present invention.

The present invention provides a function that can perform a series of operations desired by a user through an interface between an ME (Mobile Equipment) and a SIM (Subscriber Identity Module) that support a SAT (Sim Application Toolkit). For this, the present invention provides a combination of commands so that a series of operations desired by the user can be performed in the ME using the SAT. Specifically, the present invention enables the ME to provide a user-defined SAT service for automatically performing a series of operations desired by the user by combining and storing SAT commands so that a series of operations desired by the user can be performed and then causing a SIM application in the SIM to successively perform the stored SAT commands.

According to the present invention, the terminal user directly constructs a macro by tying several commands using the SAT. Thereafter, operations that require repeated operations or complicated execution processes can be successively performed using a single execution input which invokes the macro.

Hereinafter, the flow of a command transmission between the SIM and the UE will be explained with reference to FIG. 1.

Figure 1:
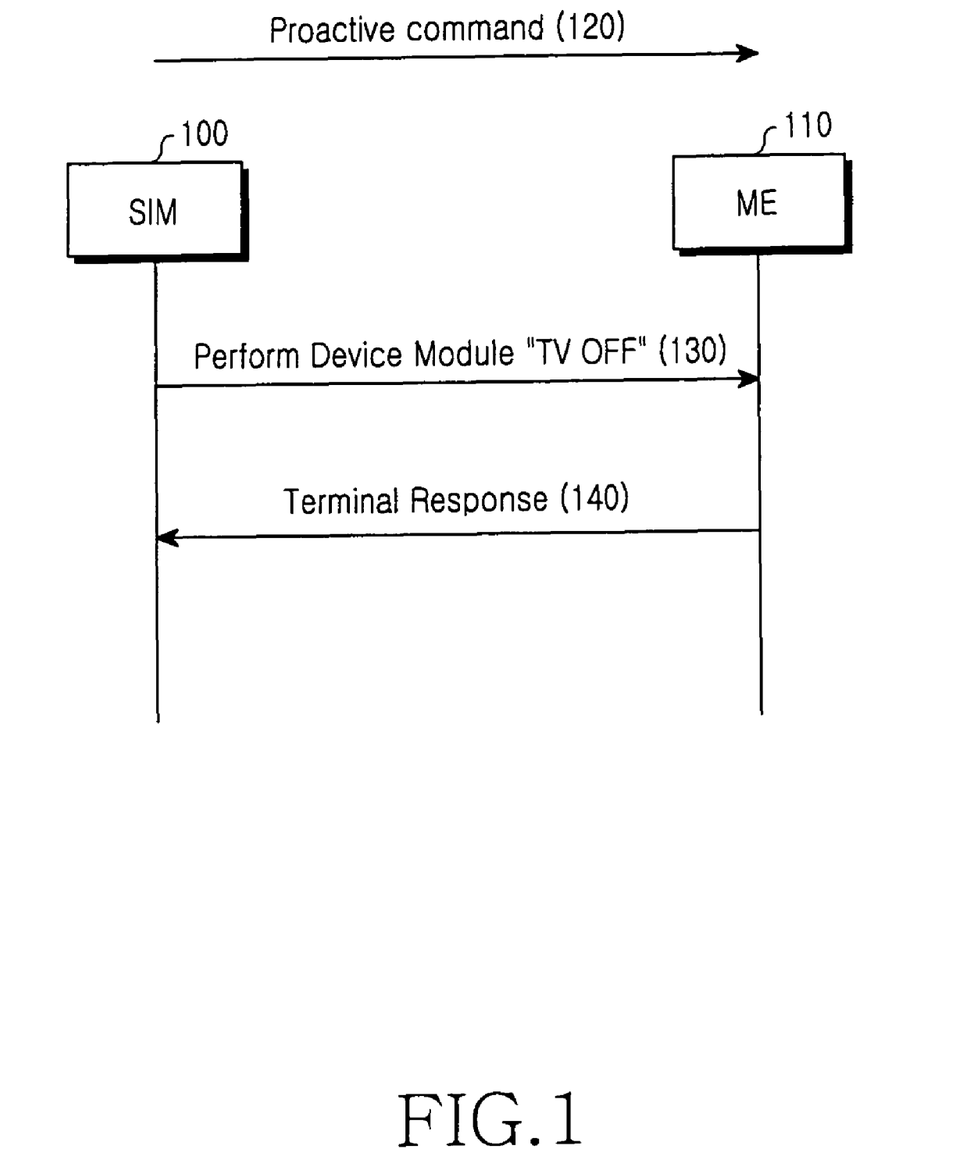
FIG. 1 is a flow diagram illustrating a transmission flow of a proactive command transmitted from a SIM to an ME according to an embodiment of the present invention.

FIG. 1 is a flow diagram illustrating the flow of the command transmission between the SIM and the UE using the SAT according to an embodiment of the present invention. As illustrated in FIG. 1, in providing a command for controlling a sub-device attached to the ME, the SIM 100 transmits a proactive command 120 to the ME 110.

For example, if the SIM 100 transmits a command for performing a device module "TV OFF" to the ME 110 (step 130), the ME 110 transmits a response signal corresponding to the transmitted command, i.e., a terminal response, to the SIM 100 (step 140). Specifically, the SIM 100 determines whether information to be transmitted to the ME 110 exists, and if the information to be transmitted exists, it permits to transmit the corresponding command. Accordingly, if the command transmitted from the SIM 100 reaches the ME 100, the ME 100 analyses information included in the corresponding command. If the received command indicates the "TV OFF", the ME 110 controls the corresponding device module, i.e., controls the power of a TV module to be shut off. Accordingly, a response from the ME 110 to the SIM 100 is effected.

Meanwhile, the command signal of the SAT is classified into a proactive command being transmitted from the SIM 100 to the ME 110 and an envelope command being transmitted from the ME 110 to the SIM 100. The respective command signal has a TLV structure composed of a tag for distinguishing the command's type, a length indicating a length of the command and a value including actual information for executing the command.

Figure 2A:
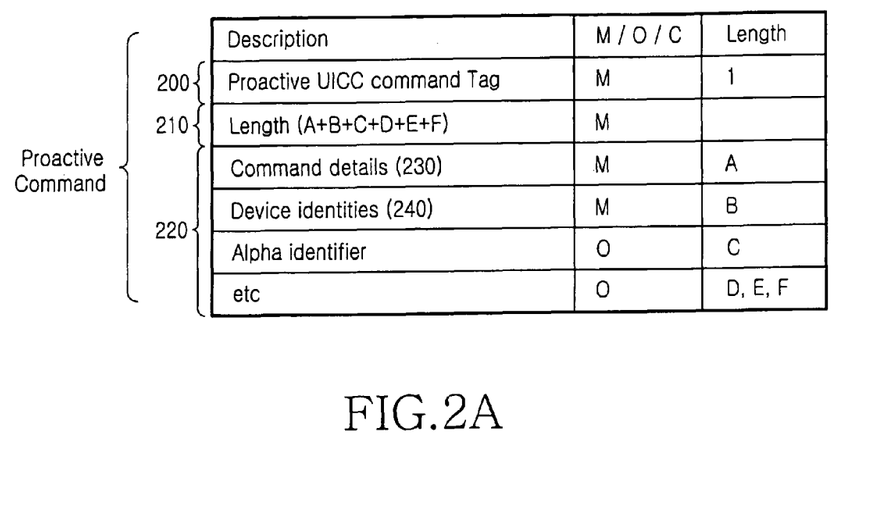
FIG. 2A is a table illustrating a structure of a proactive command according to an embodiment of the present invention.

First, the structure of the command directed from the SIM to the ME, i.e., the proactive command, among the TLV structure of the SAT command signal is as illustrated in FIG. 2A that is a view exemplifying the structure of the proactive command according to an embodiment of the present invention. As illustrated in FIG. 2a, the ME determines that the SIM processing command is from the SIM through a proactive UICC (Universal IC Card) command tag 200. The proactive command includes a detailed command (command details, device identities, alpha identifier, etc.) 220 of the command, and a length 210 that indicates the length of the detailed command.

Specifically, the proactive command includes a proactive UICC command tag 200 having a single bit that has command number information, a length (A+B+C+D+E+F) 210 of specified bits corresponding to length information of the detailed command, command details 230 of A bits having detailed item information of the command, device identifier 240 of B bits indicating the device numbers of a source device and a destination device, an alpha identifier of C bits for indicating the execution state of the command as a text, and other D, E and F bits.

The command of FIG. 2A includes essential elements including the proactive UICC command tag 200, the length 210, the command details 230 and the device identifier 240 and optional elements including the alpha identifier and others.

Figure 2B:
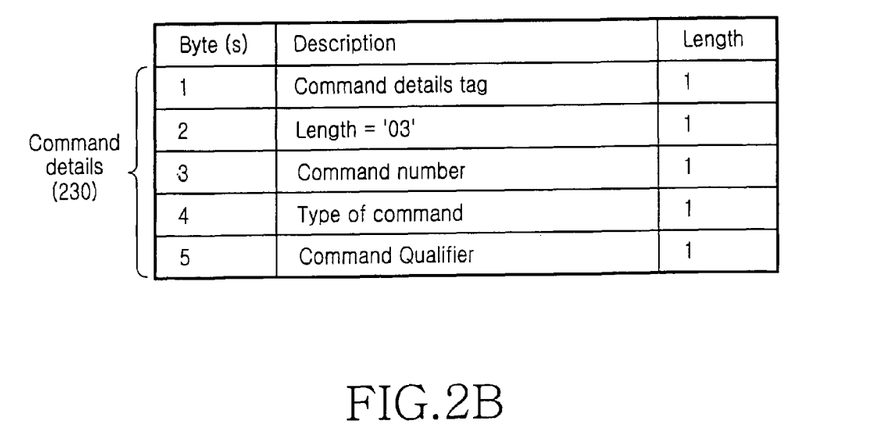
FIG. 2B is a table illustrating a structure of command details among the proactive command structure of FIG. 2A.

The command details 230 of the detailed command includes five bytes as illustrated in FIG. 2B. The first byte corresponds to a command details tag having a length of one byte, and the second byte indicates "3" bytes corresponding to the sum of the lengths of the third to fifth detailed information elements, i.e., a command number, a type of command and a command qualifier, each of which includes a single byte.

The third to fifth bytes correspond to the command number for assigning an identification number to the respective command so as to distinguish the respective command when the proactive commands are simultaneously transmitted in a single operation, the type of command for indicating the command that instructs a specified operation, and the command qualifier for assigning the qualification such as the order of operation and so on.

Figure 2C:
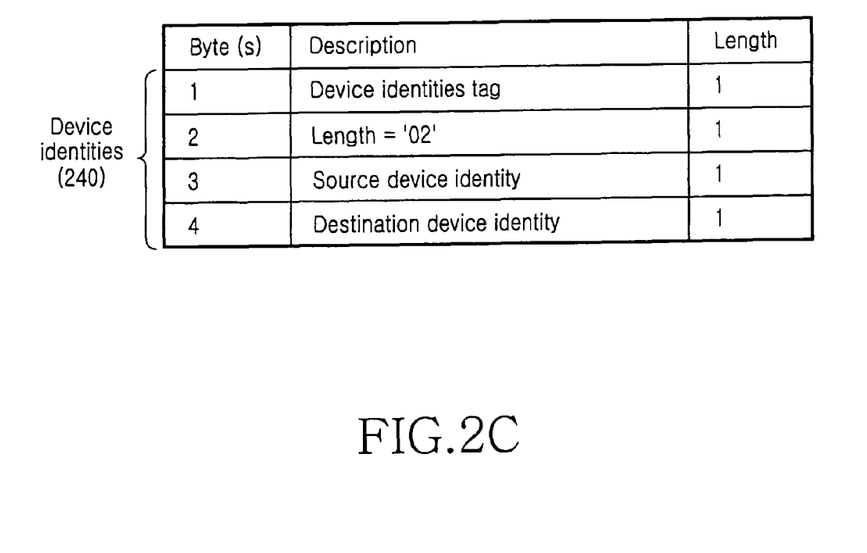
FIG. 2C is a table illustrating a structure of a device identity among the proactive command structure of FIG. 2A.

The device identities 240 of the detailed command includes of four bytes as illustrated in FIG. 2C. The first byte corresponds to a device identities tag having a length of one byte, and the second byte indicates "2" bytes corresponding to the sum of the lengths of the third to fourth signal elements, i.e., a source device identity and a destination device identity, each of which includes a single byte. The third to fourth bytes correspond to the source device identity for indicating source information and the destination device identity for indicating the identification number of the corresponding device to be driven so that the command is transmitted to the corresponding device.

Figure 3:
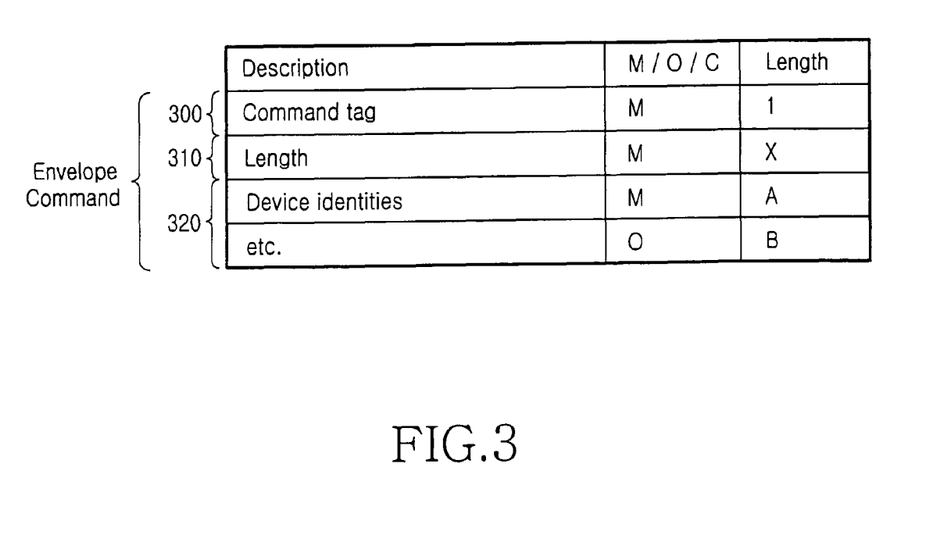
FIG. 3 is a table illustrating a structure of an envelope command according to an embodiment of the present invention.

As described above, the proactive command from the SIM to the ME is constructed as illustrated in FIG. 2A, and its detailed construction is shown in FIGS. 2B and 2C. Meanwhile, the envelope command from the ME to the SIM is constructed as illustrated in FIG. 3. The envelope command includes a command tag 300, a length 310 and a detailed command (device identities, etc.) 320.

In the following description, the process of providing diverse SAT services to the user using a SAT function that can provide diverse interfaces between the SIM and the ME will be explained. Here, the SAT function for the diverse interfaces between the SIM and the UE is performed through the proactive command and the envelope command, and through these commands, the user can control the ME to perform operations desired by the user.

For this, in the embodiment of the present invention, a single command is constructed by setting a specified value in a specified field of the proactive command or the envelope command so that the operation desired by the user can be performed in the ME. At this time, in order to perform a series of operations in succession, several commands constructed as above can be tied into one operation, and the order of their operation is determined for their successive execution. This order of operation may be set in the command qualifier of the command format for assigning the qualification for the order of operation. This function of recording the order of operation and automatically executing the commands in succession is called a macro function.

As described above, according to the present invention, the user can build the macro by tying several commands frequently used to suit the purpose of use, and can execute the desired macro by one key input without the necessity of using the respective commands on a one-by-one basis. That is, the user can successively execute the command group in the macro.

The tied commands are stored in an EF (Elementary File) of the SIM, and in the following description, the EF in which the SAT commands are stored is called EF_SAT_EDIT for the sake of clarity. Accordingly, the tied commands are successively executed in the ME by executing the macro execution only once. If the key input for instructing the macro execution is made, the stored command contents are successively loaded from EF_SAT_EDIT, and the loaded commands are transferred to a related module for providing a typical SAT service. Accordingly, if the user inputs a key having a specified macro function only once instead of inputting the commands on a one-by-one basis, the ME provides a SAT service having a series of operations by automatically performing the operations according to the commands. The operation between the SIM and the ME according to the command transmission is the same as the typical operation, the detailed explanation thereof will be omitted for the sake of clarity.

Figure 4A:
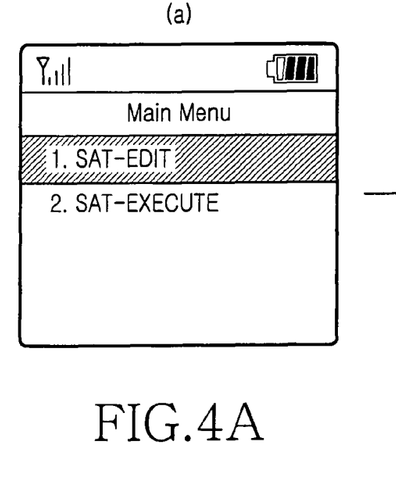
FIGS. 4A and 4B are exemplary screenshots illustrating a menu construction for macro correction and execution according to an embodiment of the present invention.
Figure 4B:
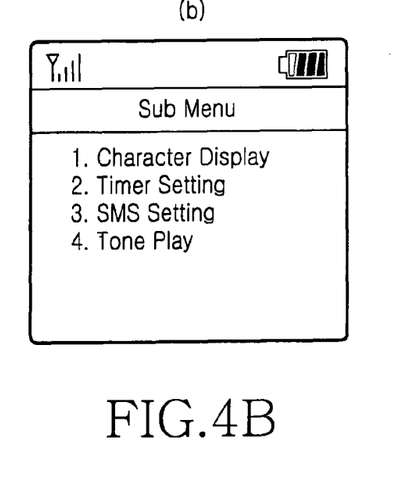
Figure 5A:
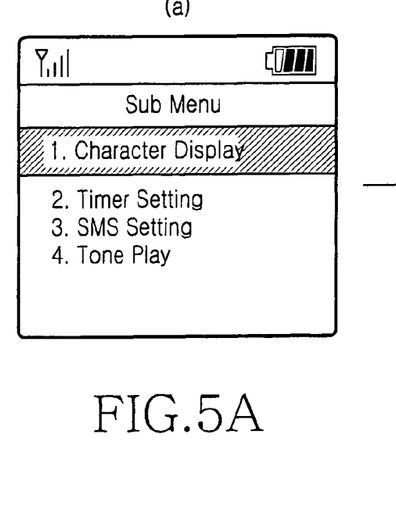
FIGS. 5A and 5B are exemplary screenshots illustrating a case that a "Character Display" menu of FIG. 4B is selected.
Figure 5B:
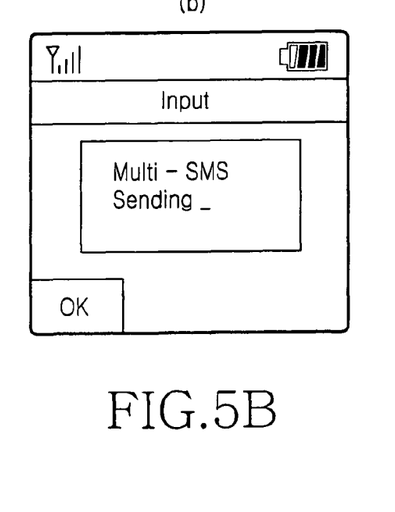
Figure 6A:
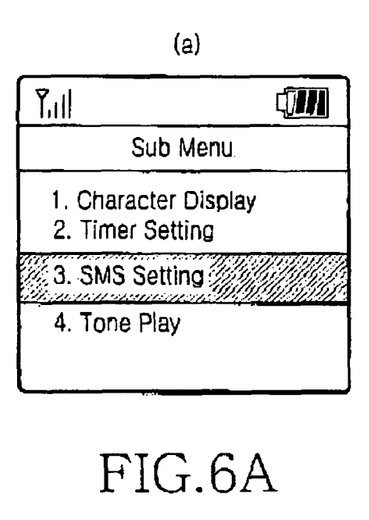
FIGS. 6A and 6B are exemplary screenshots illustrating a case that an "SMS Setting" menu of FIG. 4B is selected.

Now, examples of menu construction according to the present invention will be explained in detail with reference to FIGS. 4A and 4B to 6A and 6B. FIGS. 4A and 4B which are views exemplifying a menu construction for macro correction and execution according to an embodiment of the present invention. FIGS. 5A and 5B are views exemplifying a case that a "Character Display" menu of FIG. 4B is selected, and FIGS. 6A and 6A are views exemplifying a case that an "SMS Setting" menu of FIG. 4B is selected.

First, in the embodiment of the present invention, the macro edition for constructing commands according to a series of operations desired by the user and the execution of the macro including the respective commands are implemented as UI (User Interface) menus "SAT-EDIT" and "SAT-EXECUTE" as illustrated in FIG. 4A. Accordingly, if the menu "SAT-EDIT" is selected among menus being displayed on a display screen, the user can make the desired macro, and if the menu "SAT-EXECUTE" is selected, the user can execute the macro already made, so that the ME performs a series of operations.

Hereinafter, it is exemplified that the contents "Multi-SMS Sending" are displayed on the display screen of the user's terminal, and a macro which is composed of an operation for simultaneously sending a short message "Hello" to persons A, B, C and D at intervals of five minutes is prepared.

In order to make the macro as described above, the SIM may provide a built-in menu as illustrated in FIG. 4A, which is displayed on the display screen of the ME as the user interface menu. In this case, the user may select the menu SAT-EDIT in order to make the macro. If the user selects the menu SAT-EDIT, sub-menus of the menu SAT-EDIT are displayed on the display screen of the ME as illustrated in FIG. 4B. The sub-menus may include "Character Display", "Timer Setting", "SMS Setting" and "Tone Play".

The user may select the menu Character Display in order to display the contents "Multi-SMS Sending" on the display screen. If the menu Character Display is selected from among the sub-menus of the macro edition menu as illustrated in FIG. 5A, a contents input window as illustrated in FIG. 5B is displayed on the display screen in the form of a popup window, so that the user can input the corresponding contents. At this time, "Multi-SMS Sending" inputted on the contents window means a title of the macro. If the input of the macro title is completed as above, the contents are transferred to the SIM, and simultaneously, the SIM application constructs a command <DISPLAY TEXT> in a specified format based on the transferred contents to store the constructed command in EF_SAT_EDIT.

Figure 6B:
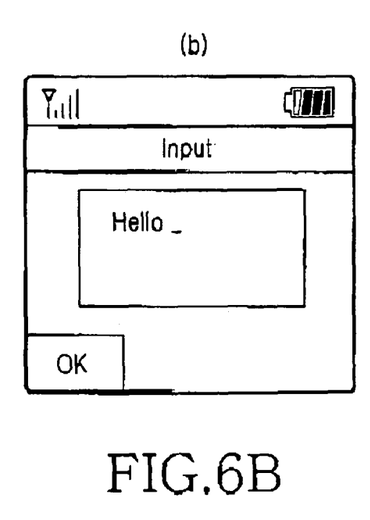

Then, the user may select the menu "SMS Setting" in order to prepare the short message "Hello" to be transmitted to the person A. If the menu SMS Setting is selected among the sub-menus of the macro edition menu as illustrated in FIG. 6a, an input window for preparing the short message as illustrated in FIG. 6b is displayed on the display screen in the form of a popup window, so that the user can input the corresponding contents. Then, the user inputs the phone number of the opposite party A to whom the prepared short message is to be transmitted to complete the preparing of the short message. If the inputted short message information is transferred to the SIM, the SIM application constructs a command <SEND SM> based on the transferred short message information and stores the constructed command in DF_SAT_EDIT.

Then, the user may select the menu Time Setting in order to transmit the short message to the persons B, C and D at intervals of five minutes. Specifically, if the menu Time Setting is selected, a menu for inputting a delay time is displayed on the display screen, and the user may input "five minutes" to complete the setting. If the inputted information is transferred to the SIM, the SIM application constructs a command <TIMER MANAGEMENT> based on the transferred delay time information and stores the constructed command in DF_SAT_EDIT.

Then, the user repeats the delay time setting process after inputting the short message to be transmitted to the persons B and C in the same manner as the inputting of the short message to be transmitted to the person A. At this time, the user does not input the delay time after inputting the short message to be transmitted to the last person D. Thereafter, the user may set a TONE that is an output sound for informing the user of the transmission of the short message to all the persons. For this, if the user selects a menu "Tone Play" and then determines the kind of output sound being displayed on the display screen, information about the kind of output sound is transferred to the SIM, and the SIM application constructs a command <PLAY TONE> and stores the constructed command in EF_SAT_EDIT.

Through the above-described process, several commands <DISPLAY TEXT>, <SEND SM>, <TIMER MANAGEMENT> and <PLAY TONE> are tied into a command group, and the macro composed of the command group is formed.

Meanwhile, if the user intends to execute the macro composed of the command group as described above, the user may select the menu SAT-EXECUTE among the menus displayed on the display screen as illustrated in FIG. 4a. If the menu SAT-EXECUTE is selected, the SIM application recognizes the input of the macro execution, and performs the corresponding command by successively loading the commands in the macro stored in EF_SAT_EDIT. The command performing process as described above will now be explained with reference to FIG. 7.

Figure 7:
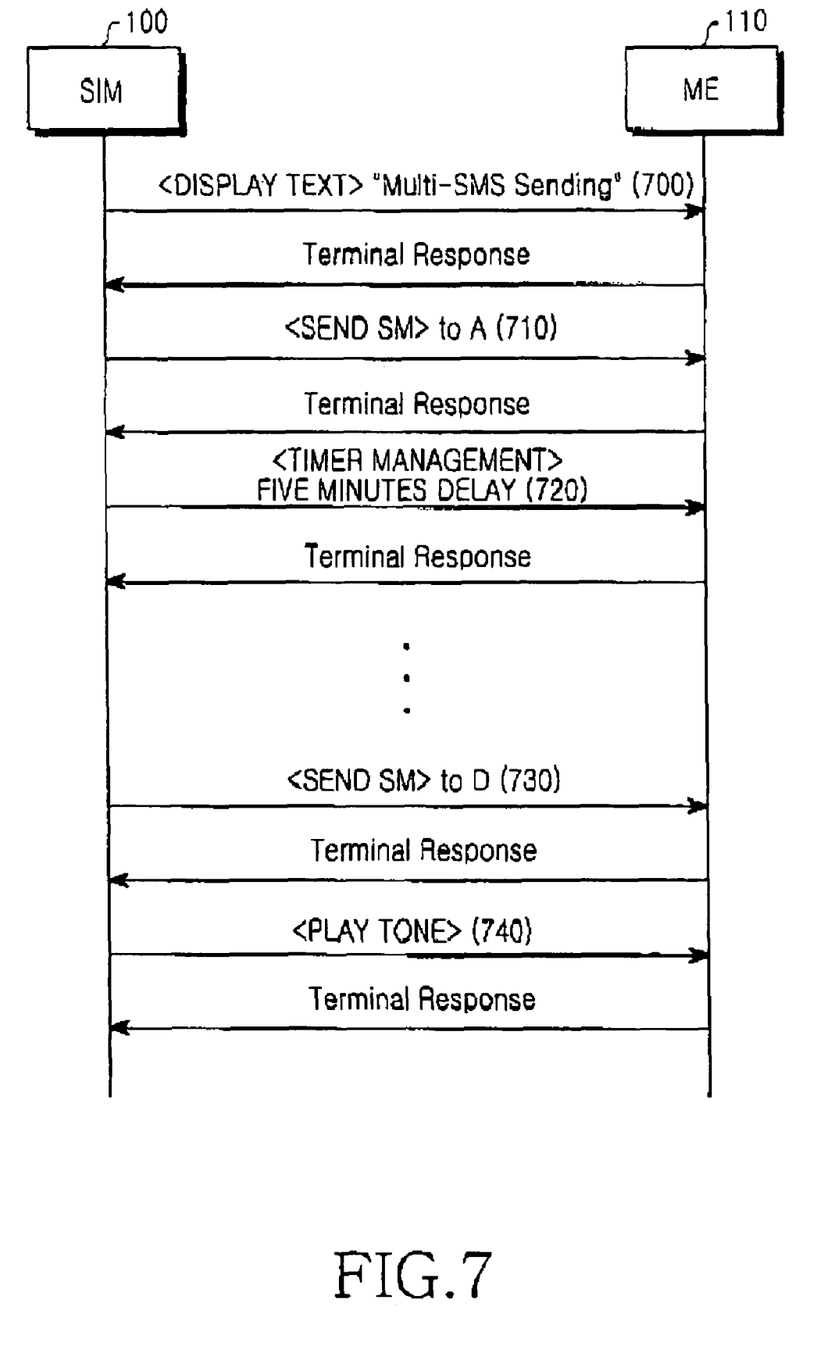
FIG. 7 is a flow diagram illustrating a transmission flow of commands for a macro execution between a SIM and an ME according to an embodiment of the present invention.

FIG. 7 is a flowchart illustrating the transmission flow of commands for a macro execution between the SIM and the ME according to an embodiment of the present invention.

As illustrated in FIG. 7, in order to execute a pre-stored macro, it is determined whether a macro execution instruction is input, and if the macro execution instruction is input, the SIM 100 transmits a command <DISPLAY TEXT> for displaying the contents "Multi-SMS Sending" on the display screen to the ME 110 at step 700. Then, the SIM 100 transmits a command <SEND SM> for transmitting a short message "Hello" to a person A at step 710. Thereafter, in order to give a specified delay time before transmitting the short message to a person B, the SIM 100 transmits a command <TIMER MANAGEMENT> for a delay time setting to the ME 110 at step 720. After the repeated transmission of the commands <SEND SM> and <TIMER MANAGEMENT>, the SIM 100 transmits the command <SEND SM> for transmitting the short message to a person D at step 730. Thereafter, the SIM 100 proceeds to step 740, and transmits a command <PLAY TONE> for informing the ME of the completion of the short message transmission to all the persons to the ME 110. Whenever each command is transmitted to the ME 110, SIM 100 receives a terminal response which is a response signal corresponding to each command. By doing this, the user can cause a series of operations, desired by the user, be successively performed, and through this, diverse SAT services can be provided.

Although it is exemplified that the SIM provides the sub-menus of the SAT-EDIT menu in the built-in form to make the macro, it is also possible to edit the sub-menus according to the present invention. That is, the user may directly edit the sub-menus being displayed on the display screen while the menu SAT-EDIT is selected. The sub-menu is a menu that enables the user to input a series of information required to construct a macro for executing at least one operation, and through the sub-menu, the user can input information for controlling respective sub-devices of the ME so that the ME can perform a series of operations.

Hereinafter, it is exemplified that a TV broadcast is recorded. For this, it is assumed that the ME is provided with a moving image player function for playing/recording the received image in addition to the TV broadcast receiving function.

If the user intends to automatically record the TV broadcast for a desired period of time using the SAT function, the SIM should provide a command for power-on of the TV receiver, a command for tuning a desired TV channel, a command for recording the TV broadcast with the moving image player and a command for stopping the operation of the moving image player so as to control the sub-devices in addition to basic commands such as <MORE TIME>, <SETUP MENU>, <SELECT ITEM>, <SEND SM>, <TIMER MANAGEMENT>, etc. For this, information according to the characteristics of the devices used in the ME may be set in a specified field of the format of the proactive command and the envelope command, or a separate command field may be added and/or deleted.

In order to make a reserved recording of the TV broadcast possible, it is required for the user to set the timer by the present time. Also, the user should set the on/off time of the power of the TV receiver, the corresponding channel through which the desired broadcasting program is telecast, and the driving of the moving image player to perform the recording when the set reserved recording time arrives. Accordingly, menus according to the respective steps should be implemented as the sub-menus of the menu 'SAT-EDIT'. If the user completes the input of the corresponding information according to the respective steps through the sub-menus being displayed on the display screen of the ME, a macro for the reserved recording of the TV broadcast is produced.

If the information for controlling the ME for each sub-menu is inputted from the user and then transferred to the SIM, the SIM constructs and ties the respective commands into a macro by coding the transferred information in a specified format, and stores the tied commands in EF_SAT_EDIT. Then, if the user's instruction of executing the reserved recording of the TV broadcast is inputted, the SIM successively reads the contents stored in EF_SAT_EDIT and transfers the read contents to the ME. Accordingly, the ME performs the reserved recording of the TV broadcast according to the respective commands that constitute the macro for the reserved recording of the TV broadcast.

As described above, according to the present invention, a macro function is added between the ME and the SIM that support the SAT, and thus desired commands are successively executed through one execution instruction. Accordingly, the user can perform a series of operations desired by the user without inputting the respective commands on a one-by-one basis.

In the embodiment of the present invention, it is exemplified that the macro function refers to the SMS transmission to many persons and the reserved recording of TV broadcasts. However, it will be apparent that the present invention can be applied to many other additional functions of the ME according to the user's special requests.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for implementing a macro using a SAT (SIM Application Toolkit), the apparatus comprising:
    an ME (Mobile Equipment) for providing a macro edition menu for editing a macro for executing a plurality of SAT commands in succession, and transmitting information input from a user with respect at least one macro edit function of the edition menu to a SIM (Subscriber Identity Module); and
    the SIM (Subscriber Identity Module) for receiving the information and constructing respective commands into a macro using the received information,
    wherein the ME successively reads the commands that constitute the macro stored in the SIM and performs a series of operations according to the commands when the user inputs a macro execution instruction and
    wherein the commands are for controlling at least one sub-device attached to the ME.

2. The apparatus as claimed in claim 1, wherein the macro edition function is displayed in sub-menu form so that information for controlling sub-devices of the ME can be input.

3. The apparatus as claimed in claim 1, wherein the macro edition function of edition menu is built-in.

4. The apparatus as claimed in claim 1, wherein the construction of the edition function of the macro edition menu can be edited by the user.

5. The apparatus as claimed in claim 1, wherein the SIM stores the respective commands by performing a coding in a specified format based on received information, as information for controlling the ME through the edition function is input by the user, and the SIM produces a macro for successively performing a series of operations according to the commands by tying the stored commands, if the macro edition is completed.

6. The apparatus as claimed in claim 5, wherein the SIM sets information according to characteristics of devices used in the ME in a specified field of the format of a proactive command and an envelope command based on the transferred information.

7. The apparatus as claimed in claim 1, wherein if a menu for a macro execution is selected by the user, the ME successively reads the commands that constitute the macro from the SIM, analyzes the commands in a specified format, and successively performs a series of operations according to a result of analysis.

8. The apparatus as claimed in claim 1, wherein the SIM further includes a specified EF (Elementary File) for storing the commands constructed in a specified format based on information transferred from the ME.

9. The apparatus as claimed in claim 8, wherein the commands stored in the specified EF are stored in the order of the respective command's operation for performing a successive execution.

10. A macro implementing method using a SAT (SIM Application Toolkit) between a SIM (Subscriber Identity Module) and an ME (Mobile Equipment), the method comprising the steps of:
    displaying sub-menus of an edition menu for editing a macro for executing a plurality of SAT commands in succession when a menu for a macro edition is selected by a user;
    transferring information inputted by a user to the SIM when the user inputs for each of the sub-menus the information for controlling the ME;
    storing respective commands by performing a coding in a specified format based on the transferred information, by the SIM; and
    producing a macro for successively performing a series of operations according to the commands by tying the stored commands when the macro edition is completed,
    wherein the commands are for controlling at least one sub-device attached to the ME.

11. The method as claimed in claim 10, further comprising the steps of:
    successively transmitting the commands that constitute the macro, if a menu for a macro execution is selected by the user, by the SIM; and
    analyzing the transmitted commands corresponding to the command transmission, and successively performing a series of operations according to a result of analysis, by the ME.

12. The method as claimed in claim 11, wherein the step of successively transmitting the commands comprises the steps of:
    the SIM successively loading the stored commands, by the SIM when the menu for the macro execution is selected by the user; and
    transmitting the corresponding commands to corresponding modules of the ME according to an order of loading.

13. The method as claimed in claim 10, wherein the commands stored by the SIM are proactive commands obtained by coding information for controlling corresponding modules of the ME that is input by from the user.

14. The method as claimed in claim 10, wherein the sub-menus are constructed in a manner that information for controlling respective sub-devices of the ME can be input to enable the ME to perform a series of operations.

15. The method as claimed in claim 14, wherein the sub-menus are menus through which a series of information inputs required to construct the macro can be performed.

16. The method as claimed in claim 10, wherein the stored commands are stored in the order of the respective command's operation for performing a successive execution.

* * * * *